Feb. 1, 1955 E. L. HOPKINS 2,700,976
STRAW RACK HAVING VIBRATORS AND OVERHUNG RAKES
Filed Jan. 2, 1952 3 Sheets-Sheet 1

INVENTOR.
ELMER L. HOPKINS
BY
ATTORNEY

Feb. 1, 1955     E. L. HOPKINS     2,700,976
STRAW RACK HAVING VIBRATORS AND OVERHUNG RAKES
Filed Jan. 2, 1952     3 Sheets-Sheet 3

INVENTOR.
ELMER L. HOPKINS
BY
ATTORNEY

United States Patent Office 2,700,976
Patented Feb. 1, 1955

2,700,976

STRAW RACK HAVING VIBRATORS AND OVERHUNG RAKES

Elmer L. Hopkins, Saginaw, Mich.

Application January 2, 1952, Serial No. 264,523

1 Claim. (Cl. 130—22)

This invention relates to improvements in threshing machines and more particularly to an improved mechanism for moving the straw through the threshing machine at a controlled rate of flow and at the same time appreciably increasing the threshing action to which the grain is subjected.

Heretofore, it has been conventional practice to use an agitated straw rack or floor near the straw discharge end of the threshing machine or combine to separate the grain from the straw and move the straw through the straw rack area of the machine. This mechanism provides some threshing action for the straw but appreciable quantities of grain, normally between 10 and 12%, remain in the straw and are lost when the straw is discharged by the machine. This is a particularly serious loss when the threshing is done in a combine and the straw instead of being stacked and fed to animals later is discharged in the field as the combine passes along. One of the primary objects of my invention is to effect a more thorough and effective threshing action within the straw rack area whereby this remaining 10 or 12% grain will be effectively separated from the straw.

Considerable difficulty has been experienced in existing equipment resulting from the building up or piling up of the straw in the thresher due in part to uneven feeding of the grain to the threshing machine and to varying conditions of the grain as it enters the machine. These pile ups also occur because of the ineffective means used to move the straw through the straw rack area. The agitators presently in use provide an agitated straw rack but this has not prevented this periodic building up of the straw within the straw rack area. This piling up of the straw results in a great loss of efficiency in grain separation as well as frequent damage to the thresher or combine. When a large build up occurs in the thresher, it is frequently necessary to halt operations, open the machine, and remove the piled up straw before any further threshing can be done. By avoiding these build ups this serious time loss is eliminated as well as time losses necessitated by repairs to injured parts. Further efficiency in operation is obtained by the elimination of damaged parts which do not halt operations but seriously and adversely affect the efficiency of the machine.

A further major object of my invention is to eliminate the building up or piling up of the straw, irrespective of the rate of feed of the grain to the thresher and irrespective of the condition of the grain as it is fed to the thresher.

Present combines and threshing machines are also rendered inefficient by the absence of means whereby the machine may be adjusted to efficiently thresh grains of widely different conditions such as wet straw, insufficiently ripe grain or grain containing large quantities of uncured weed stalks. An additional object of my invention is to provided means for regulating the flow of straw through the thresher whereby straw requiring appreciably longer threshing time for effective separation of the grain may be retained in the machine long enough to effect proper separation. It is a purpose of my invention to make the rate of flow of the straw through the machine readily adjustable by means of a simple and inexpensive mechanism. Other objects of my invention include the design of an improved straw walker for the straw rack area of the threshing machine which is both easily installed and adapted to installation upon existing threshing machines.

These and other objects and purposes of my invention will become immediately apparent to those acquainted with the design and construction of agricultural equipment upon reading the following specification and the accompanying drawings.

In executing the objects and purposes of my invention, I have provided on the fishbacks of a conventional agitated floor of the straw rack area of a threshing machine or combine a plurality of vertically adjustable straw retarders for regulating the rate of flow of the straw through the straw rack area and preventing the straw from flowing in any direction other than toward the discharge end of the thresher. I also provide a pair of straw walkers mounted above the straw retarders designed to intermittently toss the straw and to advance it along the fishbacks until it is ultimately discharged from the thresher.

In the following description the terms "upstream" and "downstream" are frequently used and are to be taken to mean "upstream" toward the discharge end of the straw rack area or to the right in Figures 1 and 8 and "downstream" away therefrom. The terms "upper" and "lower" are also frequently used and/or are to be taken to mean "upper" as toward the top of the invention as the invention appears in Figures 1 and 8 and "lower" away therefrom.

Figure 1:
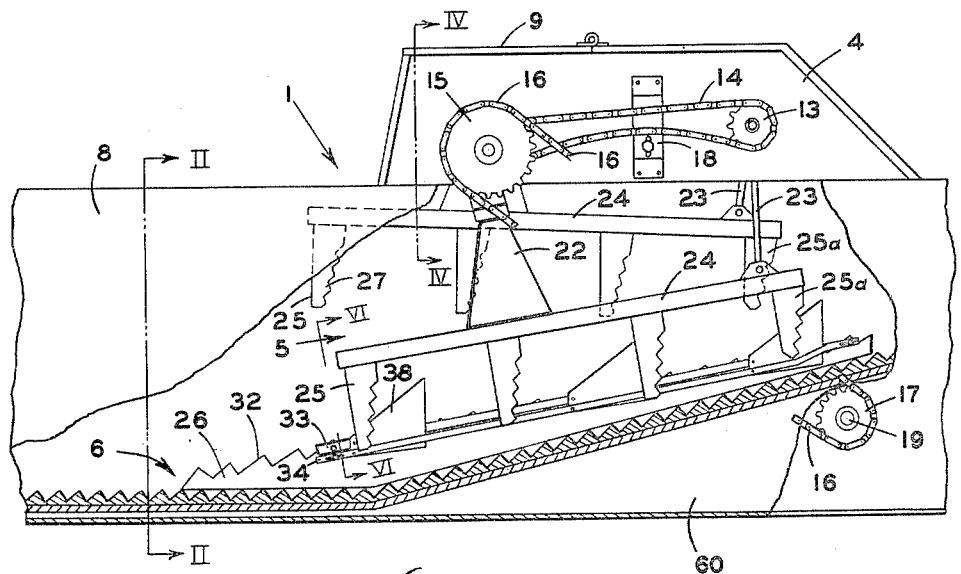
Figure 1 is a fragmentary, partially broken, side elevation view of the straw rack area of a combine equipped with my invention, not showing the floor agitating mechanism.

Referring with more particularity to the drawings, Figure 1 shows the discharge end of a threshing machine 1, within the straw rack area 3 of which is mounted my improved straw walkers. A compartment 2 open on the underside to the straw rack area 3 and enclosed by the casing 4, contains the driving mechanism for my straw walker. The compartment 2 is accessible through the hinged access door 9. The straw rack area 3 of the threshing machine is enclosed by a generally tubular housing 8. Within the straw rack area 3 a straw flow control means 6 is situated below the straw walking means 5 on the floor 7 of the threshing machine.

Figure 4:
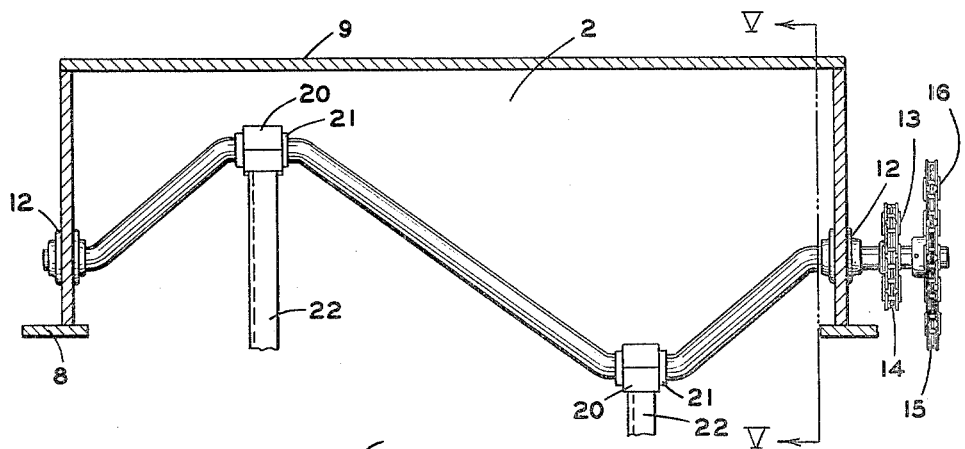
Figure 4 is an enlarged, elevation, sectional view taken along the plane IV—IV of Figure 1.
Figure 5:
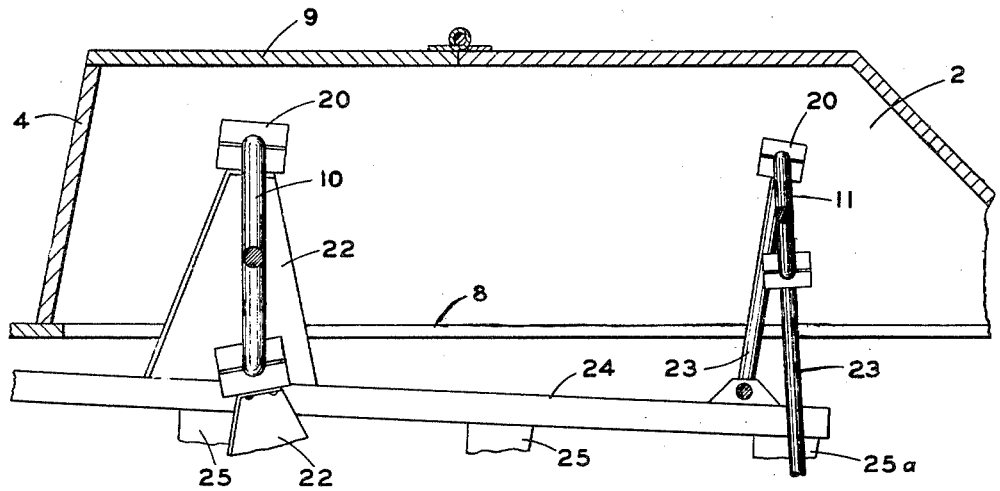
Figure 5 is a fragmentray, sectional, elevation view taken along the plane V—V of Figure 4.

The actuating means for the straw walker includes a large crank 10 and a small crank 11 (Figures 4 and 5) mounted transversely of the compartment 2 by means of bearings 12 secured to the walls of the casing 4. Each of the cranks has a pair of webs spaced in opposite directions from the axis of the crank. The spacing of the webs of the crank 10 from the axis of the crank is substantially greater than the spacing of the webs of the crank 11. The purpose of this will be explained more fully hereinafter. Each of the cranks extends through one of the side walls of the casing 4 and mounts a sprocket 13 on its end. The sprockets 13 are each of the same diameter and are connected by a chain 14. The crank 10 mounts a second sprocket 15 for receiving rotatary motion by means of the chain 16 from a driven sprocket 17. The driven sprocket 17 is mounted on the shaft 19, which shaft drives the vibration or oscillation mechanism of the floor and fishbacks of the straw rack area. The sprockets 15 and 17 have a size relationship to each other such that the crank 10 revolves through one revolution in the same time that the shaft 19 revolves through two revolutions. The importance of these relationships will be set forth under "Operation." A vertically adjustable block 18 insures the chain 14 of a proper operating tension at all times.

Rotatably mounted to both webs of each of the cranks are bearing blocks 20 held in position axially of the cranks by the collars 21. Secured to and extending downwardly from the bearing blocks on the large crank 10 are rake bar stanchions 22. Secured to and extending downwardly from the bearing blocks 20 on the small crank 11 are rake bar stanchions 23. The rake bar stanchions 22 consist of a generally triangularly shaped plate having a reinforcing flange along one edge. Each of the rake bar stanchions 22 is rigidly secured at its lower end to one end of the rake bars 24 by means of suitable fastening means such as screws or bolts. The rake bar stanchions 23 consist of rigid rods secured at their upper ends to the bearing blocks 20 of the small crank 11 and at their lower ends each pivotally secured to the other ends of the rake bars 24.

Figure 2:
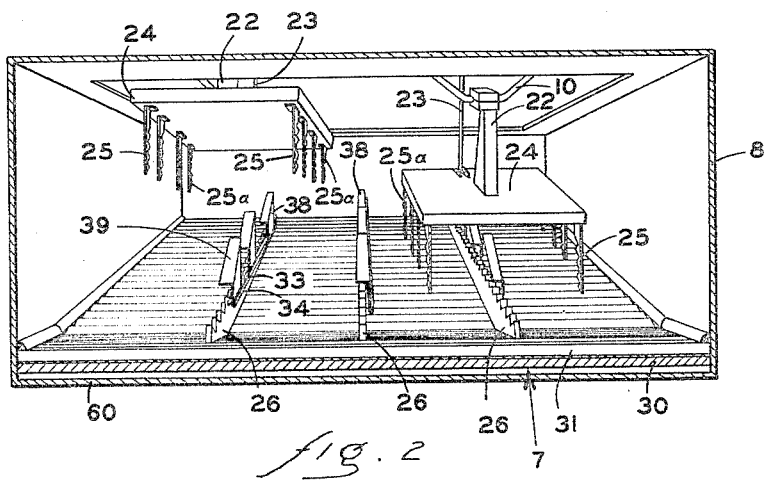
Figure 2 is a sectional, elevation view taken along the plane II—II of Figure 1.
Figure 6:
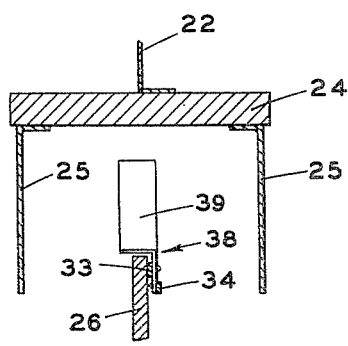
Figure 6 is an enlarged fragmentary, elevation, sectional view taken along the plane VI—VI of Figure 1.

Each of the rake bars 24 extends a short distance beyond the rake bar stanchions 23 and a substantial distance beyond the rake bar stanchion 22 and is itself a rigid member consisting of either a wooden beam or a steel bar of appreciable width. Mounted to the lower side of each of the rake bars 24 are straw advancers 25. As illustrated in Figures 1 and 2, the straw advancers 25 each consist of a downwardly extending plate having serrations or teeth 27 extending in the direction in which the straw is moved. The upper end and one side of each of the straw advancers is flanged, the upper side to provide means for mounting the advancer to the rake bar and the side for reinforcement of the plate. The serrated side of each of the straw advancers is inclined at an angle whereby the plate is tapered downwardly so that the teeth 27 are inclined to the rake bar 24. The straw advancers 25 are mounted in pairs upon the rake bars with the advancers of each pair spaced apart to clear the hereinafter described straw retarders 38 on the straw flow control means 6 (Figure 6). Four pairs of straw advancers 25 are mounted on each of the rake bars at equally spaced distances. The pair of straw advancers 25a at the discharge end of the straw rack area is smaller than the other pairs of straw advancers to provide adequate clearance from the ridges 31.

Figure 3:
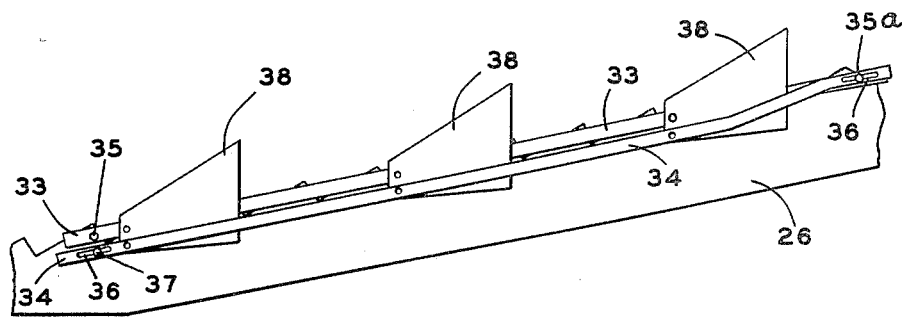
Figure 3 is a fragmentary, enlarged, side, elevation view of the straw retarders for my invention.

The floor 40 of the straw rack area 3 consists of a supporting plate 30, a portion of which is inclined upwardly toward the discharge end of the straw rack area 3. On the plate 30 are mounted a plurality of closely spaced, saw tooth type ridges 31, each extending transversely of the straw rack area 3. Spaced from each side of the straw rack area 3 are three equally spaced fishbacks 26 extending longitudinally of the chamber and, like the floor 40, inclined upwardly. Each of the fishbacks 26 has a plurality of saw tooth type teeth 32 along its upper face. These teeth are designed with a low inclination in the direction of flow of the straw and a sharp inclination in the opposite direction whereby they may grip the straw and prevent it from moving in any direction other than toward the discharge end of the straw rack area. The entire floor 40 of the straw rack area 3, in the area of operation of my straw walking means 5, is upwardly inclined toward the discharge end of the area whereby the straw walking means 5 urges the straw up this inclination with the fishbacks 26 serving as part of the means for restraining the straw from returning down the inclined surface. On the side of each of the fishbacks 26 there is mounted an upper bar 33 (Figures 1, 2 and 3). The upper bar 33 is rigidly secured to the adjacent fishback by suitable bolts 35 and 35a, one at each end. Substantially parallel to and several inches below the upper bar 33 is a lower bar 34. The lower bar seats against the opposite face of the straw retarders 38 from the upper bar 33. The end of the lower bar 34 adjacent the straw discharge end of the straw rack area is offset upwardly to overlie the upper bar 33. The lower bar 34 adjacent each end is provided with slots 36. Where the lower bar 34 overlies the upper bar 33, the bolt 35a extends through one of the slots 36. At the other end of the lower bar 34 it is supported by the bolt 37 in the other of the slots 36. By loosening the bolt 35a, the lower bar 34 may be adjusted longitudinally since the bolt 37 is not tightened sufficiently to hold the lower bar against longitudinal movement. The lower bar 34 may be locked in any particular position by tightening the bolt 35a to clamp the lower bar against the upper bar 33 and its supporting fishback 26.

Pivotally mounted to each of the upper bars 33 are three straw retarders 38. Each of the straw retarders 38 is secured to the upper bar 33 adjacent the retarder's downstream end. The lower end of each of the straw retarders 38 projects downwardly and adjacent its lower downstream end is pivotally mounted to the lower bar 34. Thus, longitudinal movement of the lower bar 34 will effect a simultaneous pivotal raising or lowering of the three straw retarders 38 connected to that particular lower bar. Each of the straw retarders 38 projects a substantial distance above the fishbacks 7 and in an upstream direction has an upwardly inclined upper surface. The upper edge of each of the straw retarders 38 has a substantially horizontal flange 38 projecting over the adjacent fishback 26. The particular angle of inclination of the upper surface of each of the straw retarders 38 is variable in accordance with the longitudinal position of the lower bar 34. Transversely of the straw rack area 3, the retarders 38 form three parallel rows.

It will be recognized that in the construction of my straw flow control means 6 that the straw retarders 38 may be adjusted by means of a pair of bars 33 and 34 in which the upper bar 33 is detachably secured to the fishback for longitudinal adjustment while the lower bar 34 is stationary with respect to the fishback.

I have described my invention as including straw retarders 38 mounted on each of the three fishbacks 26. The straw retarders 38 may be eliminated on the center fishback, utilizing them only on the two outer fishbacks. For many operations, this is a preferred construction. I have also described my straw retarders 38 as mounted on the same side of each of the fishbacks. It will be recognized that the straw retarders may be mounted on either side if such is convenient. When this arrangement is used, the straw retarders 38 are fabricated as lefts and rights whereby the top flange of the straw retarder may always extend over its supporting fishback.

Figure 7:
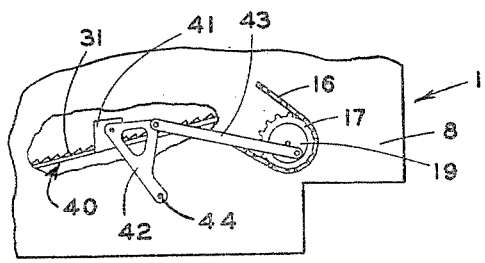
Figure 7 is a fragmentary, side, elevation view of the operating means for the floor of the straw rack area.

The floor 40, has, on one side, an upstanding plate 41 pivotally connected to a Y-shaped rocker 42 (Figure 7). The rocker 42, in turn, is connected to one end of an arm 43, which arm at its other end is eccentrically connected to the shaft 19. The rocker 42 is pivotally connected to the housing 8 at 44.

*Modification*

Figure 9:
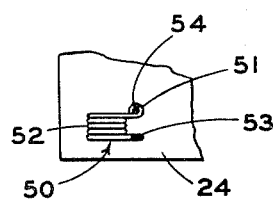
Figure 9 is an enlarged sectional view taken along the plane IX—IX of Figure 8.
Figure 8:
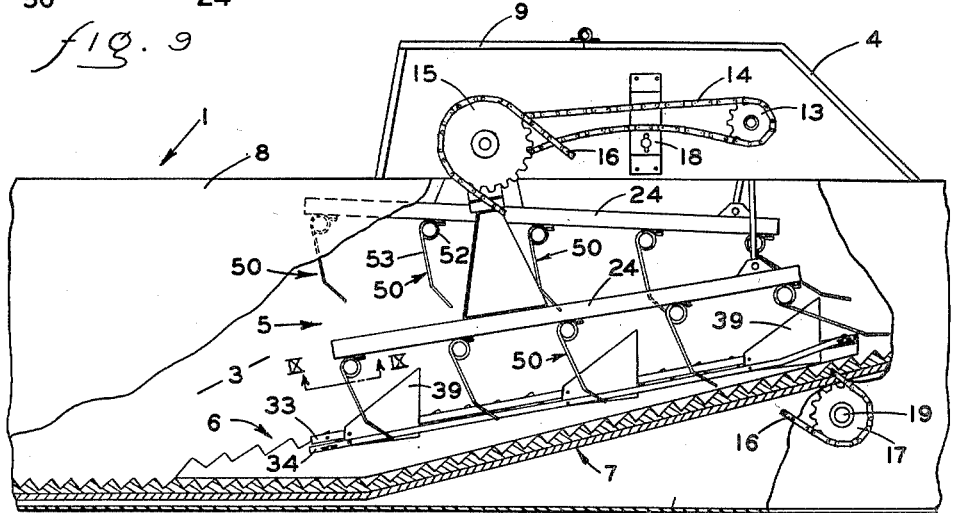
Figure 8 is a fragmentary, partially broken, side, elevation view of the straw rack area of a combine showing a modified form of my invention, not showing the floor agitating mechanism.

In the modification of my invention shown in Figures 8 and 9, the entire structure of the threshing machine, straw retarders and the straw walkers is the same except for the substitution in the straw advancers of tines for the plates. Each tine 50 consists of a mounting loop 51 integral with a coil 52 on one side. By means of a screw 54 passing through the loop 51, the tine is secured to the rake bar. An arm 53 extends downwardly from the outer end of the coil 52. The lower end of the arm 53 is inclined in an upstream direction from the main portion of the arm 53. Five pairs of tines 50 are mounted on each of the rake bars 24 at substantially equal spacings longitudinally of the rake bar. Each pair of tines 50 is so mounted to the rake bar that the depending arms 53 straddle both the straw retarders 38 and the fishbacks 26, one arm 53 passing on each side of this structure. The four downstream pairs of tines 50 on each rake bar 24 are substantially identical with the arms 53 inclined upstream with respect to a plane perpendicular to the rake bar at an angle between 5° and 10°. The lower end of each of these arms is inclined from this same plane between 15° and 30°. The arms 53 of the fifth or upstream pair of tines 50 is inclined upstream with respect to a plane perpendicular to the rake bar at an angle between 45° and 60°. All of the tines are made of spring steel. While the tines are described as separate units, they can be formed as pairs. The coil 52 increases the flexibility of the tine and prevents damage to the tine should it encounter an obstruction.

*Operation*

In operation, the entire floor 40 of the straw rack area 3 is rapidly vibrated in an upstream, downstream direction. The ridges 31, the fishbacks 26 and straw retarders 38 are subjected to this vibratory movement. The straw containing some of the grain threshed from the straw by the beaters and some grain not yet separated from the straw, is delivered to the vibrating floor or straw rack from the threshing beaters. Throughout the period during which the straw is moving through the straw rack area 3, the continuous vibration of the floor 40 agitates the straw, separating both the threshed and unthreshed grain, which, by reason of its weight, falls into the grooves formed between the ridges 31. This grain works its way laterally along these grooves and finally is discharged over the end of the floor into the grain compartment 60 below the floor.

After the straw has entered the straw rack area 3, it is picked up by the downstream straw advancers 25 on the rake bars 24 and advanced along the fishbacks by the upward sweeping movement of these rake bars. In each upstream movement of one of the rake bars, a portion of the straw is carried further up the fishbacks in a series of intermittent steps represented by each separate engagement of the straw advancers 25 with the straw. In this movement, the straw is forced up and over the straw retarders 38. After the straw has passed upstream of each of the straw retarders 38, these straw retarders limit the downstream movement of the straw under the influence of the agitating floor. This intermittent advancing operation is repeated until the straw reaches the extreme upstream end of the straw rack area 3 and is discharged from the combine. Thus, the straw is walked up the fishbacks 26 and over the retarders 38.

The rake bar stanchions 22 do the actual driving of the rake bars 24 since they provide a rigid connection between the crank 10 and the rake bars 24. The rake bar stanchions 23 serve only to support the upstream ends of the rake bars, determining only the vertical movement of the upstream end of the rake bars.

The straw advancers 25, by reason of the teeth on their upstream edge, are enabled to grip the straw and to forcibly push it forward as they are moved by the rake bars. The serrations or teeth 27 insure a firm gripping of the straw whereby it is positively moved despite the holding effect of the straw retarders 38. The inclined upper face of the straw retarders 38 facilitates the upstream movement of the straw. The teeth 27 on the straw advancers also serve another important purpose. The teeth chop the straw as they move it through the straw rack area. This chopping action is made more effective by the interaction between the straw advancers and the straw retarders. This action forcibly engages the straw with the teeth 27 of the straw advancers 25. The chopping of the straw facilitates the subsequent plowing under of the straw, thus, returning a maximum amount of the fertility to the soil.

The rake bars are actuated by means of the cranks 10 and 11. The large crank 10, preferably, has a throw of approximately 8 inches while the small crank 11 has a throw approximately 3½ inches. Thus, the vertical movement of the downstream end of the rake bars 24 is more than double that of the upstream end of the rake bars. The cranks 10 and 11 are operated in unison whereby both ends of each rake bar are moved simultaneously in the same direction. Since the rake bar stanchions 22 and 23 for one rake bar are mounted to their respective cranks at a point 180° from the rake bar stanchions 22 and 23 for the other rake bar 24, the rake bars 24 operate alternately upon the straw. When one rake bar 24 is brought down into operating relationship with the straw, the other rake bar is in its up or withdrawn position. The movement of each of the rake bars is generally circulatory whereby the rake bar descends through an arcuate path to its downstream position. As the rake bar is lowered, it picks up the straw, and moves it upstream. The rake bar then rises from the straw to the top of the rake bar area where it again moves downstream to repeat the cycle. This motion tends to roll the straw and aid in separating the remaining grain therefrom.

The movement of the rake bars 24 is coordinated with the movement of the floor 40 through the chain 16. The floor 40 goes through two complete cycles of vibratory movement while the cranks 10 and 11 make one revolution. The rake bars are so adjusted with respect to the floor that as each rake bar reaches the lowest point in its travel, the floor reaches its maximum travel upstream. Thus, as the rake bar moves upstream from its lowest point, the floor moves downstream. Since two rake bars 24 are alternately presented to the straw by each revolution of the crank, it is necessary that the floor move downstream twice during each revolution of the crank. By the simultaneous opposite movement of the rake bars 24 and the floor, the straw is forcibly tossed against the straw advancers 25. This increases the threshing action as well as the chopping of the straw.

The downstream end of the rake bar causes a violent tossing of the straw as it is picked up by the straw advancers. During this violent tossing, the straw is moved towards the discharge end of the straw rack area. Since the upstream end of the rake bar moves through a much smaller diameter circle than the downstream end, this portion of the rake bar causes appreciably less tossing of the straw. The intermediate straw advancers move in circles of intermediate diameter and have the combined purpose of threshring and mauling the straw as they move the straw toward the discharge end of the thresher. The retarders 38 are primarily responsible for the thorough agitation of the straw since they retard its flow up the fishbacks under the influence of the straw advancers. These retarder plates also cause the straw to be rotated as it is moved forward to further separate any remaining grain. At the same time, the retarders effectively prevent the straw from slipping back down the fishbacks where it can pile up and form tight wads which not only prevent effective threshing but frequently cause damage to conventional combine equipment. By reason of the teeth on the straw advancers, the straw is physically picked up and then dropped by the straw walking means, thus, assuring a violent and effective agitation of the straw for separating the grain.

The straw flow control plates or retarders 38 are made adjustable whereby they can be made to retain the straw for a greater or lesser period of time, depending upon the condition of the straw. Therefore, the rate of flow of the straw through the straw rack area could not be regulated. Heretofore, the efficiency of grain separation in this area was wholly dependent upon the condition of the grain and no adjustments could be made for variations in threshing conditions. Since perfect threshing conditions are present only during a minor portion of any threshing season, combine equipment has been, at best, a compromise to meet the average of the conditions normally encountered. My invention makes it possible to adjust the combine to meet the requirements of each individual threshing operation as well as the requirement of each type of grain threshed. Thus, the combine may always operate at maximum efficiency. When the straw is wet or damp or the grain is not ripe or the straw contains large quantities of green or semi-green weed growth, the retarders 38 are set up to their maximum position to retain the straw for a longer period of time to assure thorough separation of the grain. When the straw is dry and the grain thoroughly ripe these retarders may be set down for quick passage of the straw over the straw rack. The retarder plates are raised by moving the lower bar 34 upstream and are lowered by moving the same bar downstream.

By means of my invention, a substantially thorough supplementary threshing operation is carried out in the straw rack area. This results in a much higher recovery of grain than has heretofore been possible. It will be understood that any crop capable of threshing may be efficiently separated by my straw walker. Beans for example, the most difficult crop to thresh with present combine equipment, may be effectively threshed and separated by my straw walker.

It is to be understood that the present invention is not to be limited to the exact details of construction or exact methods shown and described as obvious modifications will be apparent to those skilled in the art. These and other modifications are to be considered as included in the hereinafter appended claim unless this claim by its language expressly states otherwise.

I claim:

In a threshing machine having a straw rack chamber adapted to discharge threshed straw at one end and including an agitated floor inclined upwardly in the direction of the discharge end and having elongated fishbacks mounted thereon for agitation with said floor, the improvement in said threshing machine including: a pair of rake bars; means mounted in said straw rack above said fishbacks imparting motion substantially paralleling said inclined and agitated floor alternately to each of said rake bars; a plurality of straw advancing plates depending from said rake bars and straddling said fishbacks urging said straw toward the discharge end of said straw rack chamber; a pair of vertically spaced elongated members extending longitudinally and mounted on two of said fishbacks; means for holding one elongated member of each pair of elongated members stationary with respect to said fishback, the other of said elongated members being movable longitudinally of said fishbacks; means for locking each of said other elongated members to said fishbacks; a plurality of vertically extending straw retarders adjustably inclined in the direction of discharge adjacent to and parallel with said fishplates and pivotally attached to each of said elongated members of each pair of elongated members for adjusting the inclination of said straw retarders.

References Cited in the file of this patent

UNITED STATES PATENTS

| Number | Name | Date |
|---|---|---|
| 188,050 | Harrison et al. | Mar. 6, 1877 |
| 372,452 | Buchanan | Nov. 1, 1887 |
| 539,177 | Herpolsheimer | May 14, 1895 |
| 644,157 | Young | Feb. 27, 1900 |
| 658,579 | Peterson | Sept. 25, 1900 |
| 885,620 | Huff | Apr. 21, 1908 |
| 1,772,978 | Barhorst | Aug. 12, 1930 |
| 2,020,380 | Schlayer | Nov. 12, 1935 |